UNITED STATES PATENT OFFICE.

PRESTON B. ROSE, OF ANN ARBOR, MICHIGAN, ASSIGNOR, BY MESNE ASSIGNMENTS, TO CLINTON S. HERBERT AND LEW B. CLARK, OF DETROIT, MICHIGAN, AND EDWARD L. WHITFORD, FRANK O. McNEW, LUCY MAY BURTON, AND L. P. WRIGHT, OF WASHINGTON, DISTRICT OF COLUMBIA.

FARINACEOUS FOOD COMPOUND.

SPECIFICATION forming part of Letters Patent No. 568,492, dated September 29, 1896.

Application filed November 1, 1895. Serial No. 567,614. (No specimens.)

*To all whom it may concern:*

Be it known that I, PRESTON B. ROSE, a citizen of the United States, residing at Ann Arbor, in the county of Washtenaw and State of Michigan, have invented certain new and useful Improvements in Food Compounds; and I do hereby declare the following to be a full, clear, and exact description of the invention, such as will enable others skilled in the art to which it appertains to make and use the same.

My invention consists in a food compound comprising a farinaceous substance mixed with peptone in any desired proportion, and said invention is fully disclosed in the following description and claims.

In carrying my invention into effect I take a certain quantity of a farinaceous substance, such as flour, cracked or rolled wheat, oatmeal, rolled oats, cornmeal, or other farinaceous substance, and combine with it a peptone in any desired proportion, preferably from one to twenty-five per cent. I prefer to use as the peptone a product known in the trade as "peptonized beef," which combines the advantages of the peptone and a nutritious substance. The farinaceous substance is mixed with water or milk and made into a dough, as in the usual process of making bread, crackers, or biscuit. The peptone in a solid, liquid, or semisolid condition, as preferred, is thoroughly incorporated with the farinaceous substance and the resulting dough is kneaded by hand or machinery, as desired, and is then molded, pressed, or formed into any preferred shape, as bread, crackers, or biscuit, and is subjected to heat for a time sufficient to bring it into the desired condition of food.

This food contains an increased amount of protein or flesh-forming albumenoid over ordinarily farinaceous foods, and the albumenoid being in the form of a peptone is predigested and is therefore readily soluble and easily assimilated, thus constituting a very desirable food compound.

While I have described the mixture of a farinaceous compound and a peptone prepared as a food in the form of bread, crackers, or biscuit, it may be prepared in other forms, if desired.

What I claim, and desire to secure by Letters Patent, is—

1. The herein-described article of manufacture consisting of a baked article of food composed of farinaceous material having a beef peptone incorporated therein, substantially as described.

2. As a new article of manufacture, bread, having peptonized beef incorporated therein, substantially as described.

In testimony whereof I affix my signature in presence of two witnesses.

PRESTON B. ROSE.

Witnesses:
   WM. W. WHEDON,
   WALTER S. HICKS.